US012190795B2

(12) United States Patent
Kim et al.

(10) Patent No.: US 12,190,795 B2
(45) Date of Patent: Jan. 7, 2025

(54) DISPLAY DEVICE AND METHOD FOR CONTROLLING LIGHT-EMITTING ELEMENT BY USING MEMRISTOR

(71) Applicant: KOREA UNIVERSITY RESEARCH AND BUSINESS FOUNDATION, Seoul (KR)

(72) Inventors: Tae Geun Kim, Seongnam-si (KR); Kyung Rock Son, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 0 days.

(21) Appl. No.: 18/279,932

(22) PCT Filed: Aug. 30, 2021

(86) PCT No.: PCT/KR2021/011589

§ 371 (c)(1),
(2) Date: Sep. 1, 2023

(87) PCT Pub. No.: WO2022/196875

PCT Pub. Date: Sep. 22, 2022

(65) Prior Publication Data

US 2024/0161683 A1 May 16, 2024

(30) Foreign Application Priority Data

Mar. 19, 2021 (KR) ........................ 10-2021-0035671

(51) Int. Cl.
*G09G 3/32* (2016.01)

(52) U.S. Cl.
CPC ....... *G09G 3/32* (2013.01); *G09G 2310/0262* (2013.01)

(58) Field of Classification Search
CPC ............. G09G 3/32; G09G 2310/0262; G09G 2300/0866; G09G 2310/0251;
(Continued)

(56) References Cited

U.S. PATENT DOCUMENTS

2013/0076950 A1* 3/2013 Eshraghian ............ H04N 25/77 348/308
2014/0049983 A1* 2/2014 Nichol ................. G02B 6/0028 362/610

(Continued)

FOREIGN PATENT DOCUMENTS

JP 6343082 B1 6/2018
KR 10-2011-0113333 A 10/2011

(Continued)

OTHER PUBLICATIONS

International Search Report issued on Dec. 6, 2021, for corresponding International Patent Application No. PCT/KR2021/011589, along with an English translation (5 pages).

(Continued)

*Primary Examiner* — Ibrahim A Khan
(74) *Attorney, Agent, or Firm* — Hauptman Ham, LLP

(57) ABSTRACT

The present disclosure relates to a display device and a method for controlling a light-emitting element using a memristor. The present invention relates to a display device and a method for controlling a light-emitting element by using a memristor. An aspect of the present invention may provide a display driving device comprising: a light emission unit configured to include a light-emitting element; a drive unit including a memristor and configured to drive the light emission unit; and a switching unit including a switching thin-film transistor and configured to determine whether to apply a data voltage to the drive unit, according to a scan voltage.

13 Claims, 16 Drawing Sheets

(58) Field of Classification Search
CPC ........... G09G 2320/043; G09G 3/3233; G09G 2330/028; H05B 45/30
See application file for complete search history.

(56) References Cited

U.S. PATENT DOCUMENTS

| | | | | |
|---|---|---|---|---|
| 2020/0312244 | A1* | 10/2020 | Yang | G09G 3/3275 |
| 2021/0335238 | A1* | 10/2021 | Song | H10K 71/20 |

FOREIGN PATENT DOCUMENTS

| | | | |
|---|---|---|---|
| KR | 10-2012-0070773 | A | 7/2012 |
| KR | 10-2015-0001424 | A | 1/2015 |
| KR | 10-2015-0109710 | A | 10/2015 |
| KR | 10-2015-0111674 | A | 10/2015 |
| KR | 10-2019-0051824 | A | 5/2019 |
| KR | 10-2019-0137728 | A | 12/2019 |
| KR | 10-2020-0022626 | A | 3/2020 |

OTHER PUBLICATIONS

Written Opinion issued on Dec. 6, 2021, for corresponding International Patent Application No. PCT/KR2021/011589 (5 pages).
Sharma et al., "Multilevel unipolar resistive memory switching in amorphous SmGdO3 thin film," Applied Physics Letters, Feb. 18, 2014, vol. 104, article No. 073501 (6 pages).
Bai et al., "Study of Multi-level Characteristics for 3D Vertical Resistive Switching Memory," Scientific Reports, Jul. 22, 2014, vol. 4, article No. 5780 (7 pages).
"Osram to Develop Automotive LED with 25,600 Pixels in One Chip for Next-gen Vehicles," LEDinside of Trendforce Corp., Sep. 23, 2019 (3 pages).

* cited by examiner

DISPLAY DEVICE AND METHOD FOR CONTROLLING LIGHT-EMITTING ELEMENT BY USING MEMRISTOR

CROSS-REFERENCE TO RELATED APPLICATION

The present application is a national stage filing under 35 U.S.C § 371 of PCT application number PCT/KR2021/011589 filed on Aug. 30, 2021, which is based upon and claims the benefit of priority to Korean Patent Application No. 10-2021-0035671, filed on Mar. 19, 2021, in the Korean Intellectual Property Office. All of the aforementioned applications are incorporated herein by reference in their entireties.

TECHNICAL FIELD

The present disclosure relates to a display device and a method for controlling a light-emitting element using a memristor.

The present disclosure is derived from a study conducted as part of a basic study of the Ministry of Science and ICT (MSIT; R&D) (Task Identification Number: 1711112266, Task Number: 2016R1A3B1908249 Research Name: Study on High Efficiency Photoelectric Device Based on Glass Transparent Electrode, Task Conducting Institution; Korea research foundation, and Research Period: Mar. 1, 2020 to Feb. 28, 2021).

BACKGROUND ART

A display driving scheme is mainly classified into a passive matrix (PM) scheme and an active matrix (AM) scheme. According to the PM scheme, a data line crosses a scan line, which is expressed in the form of an n×n matrix due to the number of lines increased. In this case, a light-emitting element (pixel) is present at every point at which the data line crosses the scan line. As a voltage signal is sequentially applied to the scan line and the data line, a current is generated from the light-emitting element due to a difference between voltages applied to the two lines, such that light is emitted from the point at which the current flows. Accordingly, the PM scheme employs a structure and a manufacturing method simple without an additional equipment, thereby showing an economical characteristic in price. However, since the pixel operates in unit of one line, as the number of lines is increased, the operating time per pixel is reduced, which degrades the quality and the brightness of a display image. In addition, as the distance between adjacent pixels is reduced due to the increase of the number of lines, cross talk (e.g., a screen overlap phenomenon) is caused, which is fatal to the display device. Therefore, according to the PM scheme, only the level of SVGA-class image quality (800×600) or less is allowed, which is inappropriate to express the information on an image, such as a moving picture, which rapidly changes rapidly.

Accordingly, the AM scheme is employed for a moving picture which needs to rapidly display a higher-resolution display or screen. The AM scheme is to employ, as a basic structure, a '2T 1C' structure in which a thin film transistor (TFT; T1) serving as a switch, a capacitor (C) to store information, a driving transistor (T2) to adjust an amount of current flowing through a pixel. According to the AM scheme, the light emitted from the pixel is sustained for one frame, even after the scan signal is transmitted. According to such an AM scheme, pixels are individually driven in unit of one frame, so a higher-brightness display is implemented without increasing power consumption, even if the number of lines is increased or the size of the pixel and the distance between pixels is reduced, when the higher-resolution display is driven.

However, recently, when realizing a micro-LED display mentioned as a next-generation display, a problem is caused in ensuring a space of a driving unit (display panel) resulting from scaling down of a light emitting unit (e.g., the micro-LED light source). In other words, even though the area of the '2T 1C' structure connected for each pixel is reduced to be appropriate to the size of the LED for AM driving, when the size of the LED is reduced, the transistor has a complex structure of three terminals and the capacitor should have the area (space) sufficient to ensure a specific capacitance. However, as the size of the capacitor is reduced, the area of the capacitor is reduced. Accordingly, the capacitor may not have a sufficient capacitance by the reduced area. In addition, the process for a pattern in several nanometers has been known in a memory semiconductor industry. However, to this end, an advanced technology of advanced equipment (e.g., an EUV process) is required. In the display process, the process of several μm or less has never been performed until now. Accordingly, when a process for a finer size needs to be performed, all infrastructures should be replaced with new ones. In other words, a micro-LED display having the smaller size (several μm) in a light emitting unit requires a novel driving unit circuit structure having a space simpler and smaller that of the '2T 1C' structure.

DETAILED DESCRIPTION OF THE INVENTION

Technical Problem

An embodiment of the present disclosure is to provide a display driving device and a method for providing an AM-type display driving circuit minimized in volume and simplified in structure by utilizing a memristor.

Technical Solution

According to an aspect of the present disclosure a display driving device may include a light emitting unit to include a light emitting element, a driving unit including a memristor to drive the light emitting unit, and a switching unit including a switching thin-film transistor to determine, depending on a scan voltage, whether to apply a data voltage to the driving unit.

In addition, the driving unit may be connected to a first node branching to the light emitting unit and the switching unit.

In addition, the switching unit may be connected to the first node, a gate line for receiving a scan voltage, and a data line for receiving the data voltage.

In addition, the switching unit may apply the data voltage, which is input from the data line, to the first node when the scan voltage is input from the gate line.

In addition, the light emitting unit may be connected to the first node and a high-potential voltage supply line for receiving a higher-potential voltage.

In addition, the data voltage is a set voltage for shifting a state of the memristor from a higher-resistance state to a lower-resistance state, or a reset voltage for shifting the state of the memristor from the lower-resistance state to the higher-resistance state.

In addition, the driving unit may shift the state of the memristor to be in the lower-resistance state without driving the light emitting unit, when the set voltage is applied to the first node, drive the light emitting unit, when the data voltage is not applied to the first node, and shift the state of the memristor to be in the higher-resistance state without driving the light emitting unit, when the reset voltage is applied to the first node.

In addition, the set voltage may exceed a difference between the higher-potential voltage and a driving voltage of the light emitting element, and may be less than the higher-potential voltage.

In addition, the reset voltage may exceed the difference between the higher-potential voltage and the driving voltage of the light emitting element, and may be less than the set voltage.

The switching unit may include a first switching unit and a second switching unit, the gate line may include a first gate line for receiving a scan voltage for an operation of the first switching unit and a scan voltage for an operation of the second switching unit, and the data line may include a first data line for receiving a set voltage, and a second data line for receiving a reset voltage.

The first switching unit may be connected to the first node, the first gate line, and the first data line.

The second switching unit may be connected to the first node, the second gate line, and the second data line.

According to an aspect of the present disclosure, a display driving method performed by the display driving device may include (a) applying a higher-potential voltage to a higher-potential voltage supply line, (b) applying a scan voltage, which is a voltage for turning on a switching unit, to a gate line, (c) applying a set voltage, which is a voltage for shifting a state of a driving unit from a higher-resistance state to a lower-resistance state, to a data line, (d) cutting off the scan voltage applied to the gate line to turn off the switching unit, (e) cutting off the higher-potential voltage applied to the higher-potential voltage supply line, (f) applying the scan voltage, which is the voltage for turning on the switching unit, to the gate line, (g) applying a reset voltage, which is a voltage for shifting the state of the driving unit from the lower-resistance state to the higher-resistance state, to the data line, and (h) cutting off the scan voltage applied to the gate line and the reset voltage applied to the data line.

According to an aspect of the present disclosure, a display driving method performed by the display driving device may include (a) applying a higher-potential voltage to a higher-potential voltage supply line, (b) applying a scan voltage, which is a voltage for turning on a first switching unit, to a first gate line, (c) applying a set voltage, which is a voltage for shifting a state of a driving unit from a higher-resistance state to a lower-resistance state, to a first data line, (d) cutting off the scan voltage applied to the first gate line to turn off the first switching unit, (e) cutting off the higher-potential voltage applied to the higher-potential voltage supply line, (f) applying a scan voltage, which is a voltage for turning on a second switching unit, to a second gate line, (g) applying a set voltage, which is a voltage for shifting the state of the driving unit from the lower-resistance state to the higher-resistance state, to a second data line, and (h) cutting off the scan voltage applied to the second gate line and the reset voltage applied to the second data line.

Advantageous Effects of the Invention

According to an embodiment of the present disclosure, in the display driving device and the method for the same, the AM-type display driving circuit, which is minimized in volume and simplified in structure, may be provided by utilizing the memristor.

In addition, the effect of extracting light may be maximized by amplifying light generated from a micro-LED light emitting element through the micro-cavity resonance effect.

BEST MODE

Figure 1:
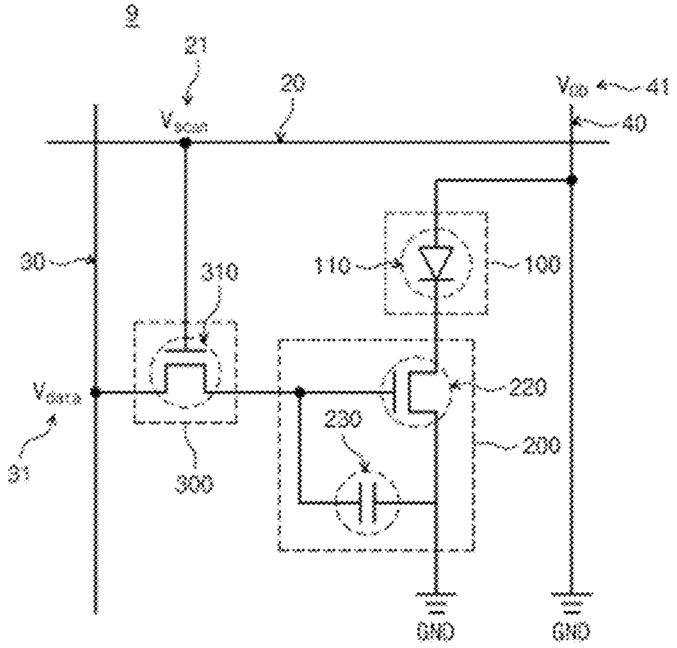
FIG. 1 is a view illustrating a conventional display driving device.

Hereinafter, detailed embodiments of the present disclosure will be described with reference to accompanying drawings.

In the following description of the present disclosure, in the case where it is determined that the detailed description of a related known configuration or function may make the subject matter of the present disclosure unclear, the details thereof may be omitted.

The embodiments of the present disclosure are provided to describe the present disclosure for those skilled in the art more completely, and may be modified in various forms in the following description, and the scope of the present disclosure should not be construed to be limited to the following description.

Rather, these embodiments are provided as examples so that the present disclosure will be thorough and complete, and will fully convey the concept of the present disclosure to those skilled in the art.

In the drawings, embodiments of the present disclosure are not limited to the specific examples provided herein and are exaggerated for clarity. In the specification, the term "and/or includes any one or all possible combinations of at least one of relevant items listed-up.

The terms used herein are provided to describe embodiments, not intended to limit the present disclosure.

In the specification, a singular form may include plural forms unless otherwise specified. The terms "comprises" and/or "comprising," when used in the specification, specify the presence of shapes, numbers, steps, operations, members, components, and/or the groups thereof.

The terms "comprises" and/or "comprising," does not exclude the present or the addition of at least another shape, number, operation, member, component, and/or groups.

Figure 2:
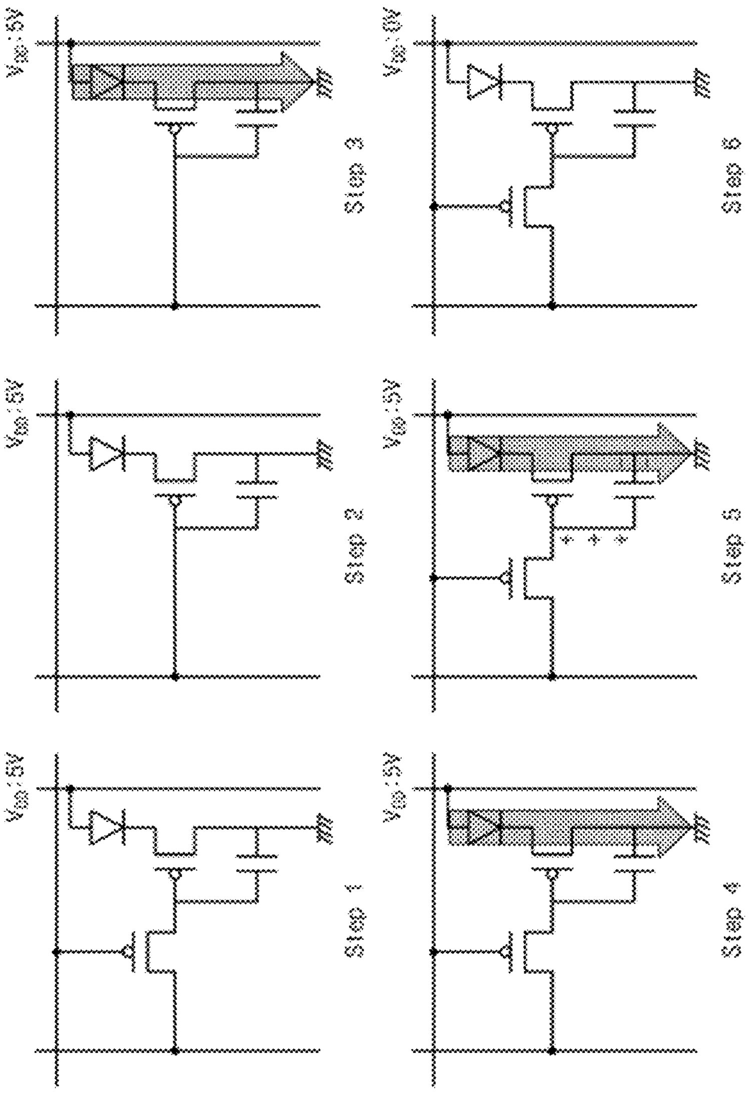
FIG. 2 is a view illustrating the operating procedures of the conventional display driving device step by step.

FIG. 1 is a view illustrating a conventional display driving device 9, and FIG. 2 is a view illustrating the operating procedures of the conventional display driving device 9 step by step.

Referring to FIG. 1, the conventional display driving device 9 includes a light-emitting element 110 included in a light emitting unit 100, a driving thin-film transistor 220 and a storage capacitor 230 included in a driving unit 200, and a switching thin-film transistor 310 included in a switching unit 300.

Referring to FIG. 2, the conventional display driving device 9 operates through the procedure including step #1 to step #6.

First, the higher-potential voltage 41 is applied through a higher-potential voltage supply line 40 (step #1).

Next, a scan voltage 21 for turning on the switching thin-film transistor 310 is applied to a gate terminal of the switching thin-film transistor 310 through a gate line (step #2).

Thereafter, a data voltage 31 for turning on the driving thin-film transistor 220 is applied to a gate terminal of the driving thin-film transistor 220 through a data line 30 (step #3). In this case, a quantity of current flowing through the driving thin-film transistor 220 may be determined depending on a voltage value of the data voltage 31 applied to the driving thin-film transistor 220, and the brightness of the light-emitting element 110 may be determined based on the quantity of current.

Next, the scan voltage 21 applied to the gate terminal of the switching thin-film transistor 310 is cut off to turn off the switching thin-film transistor 310 (step #4).

Next, as charges stored in the storage capacitor 230 are applied to the gate terminal of the driving thin-film transistor 220, the current may flow through the driving thin-film transistor 220 (step #5). In this case, the quantity of charges stored in the storage capacitor 230 may be the quantity of charges for turning on the driving thin-film transistor 220 for one frame.

Finally, the higher-potential voltage 41 applied through the higher-potential voltage supply line 40 is cut off.

The conventional display driving device 9 allows the light-emitting element 110 to operate for one frame through step #1 to step #6 described above.

However, recently, a micro-light-emitting element having the size of several μm is employed as the light-emitting element 110. Accordingly, the micro-display employing the micro-light-emitting element requires a driving circuit occupying only a simpler and smaller space in structure.

To satisfy the requirement, a display driving device 10*a* or 10*b* according to an embodiment of the present disclosure is suggested as having a structure of substituting the driving thin film transistor 220 and the storage capacitor 230 included in the driving unit 200 with a memristor 210.

Figure 3:
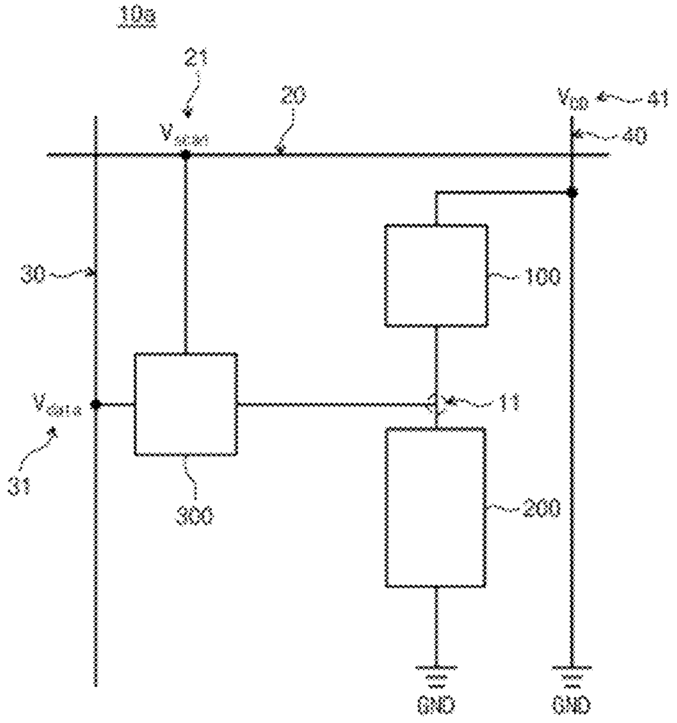
FIG. 3 is a view illustrating the display driving device including the light emitting unit, the driving unit, and the switching unit 300 according to a first embodiment of the present disclosure.
Figure 4:
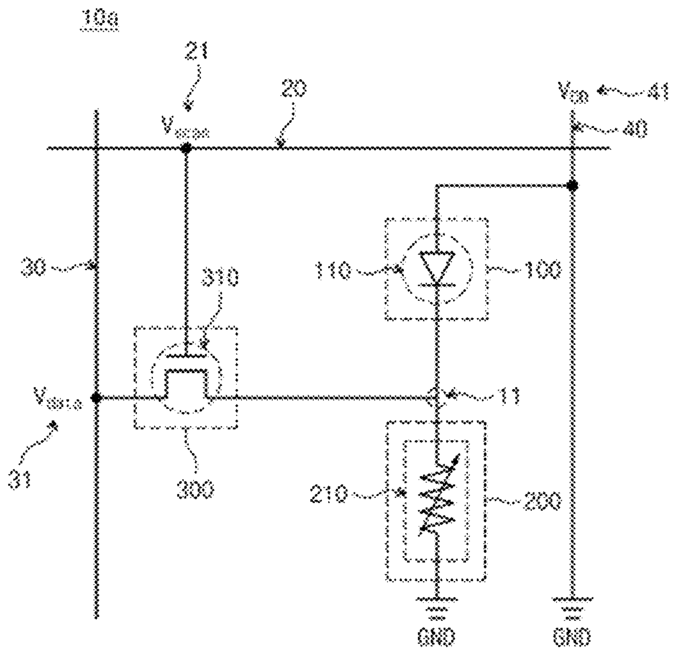
FIG. 4 is a view illustrating the display driving device according to the first embodiment of the present disclosure in more detail.

FIG. 3 is a view illustrating the display driving device 10*a* including the light emitting unit 100, the driving unit 200, and the switching unit 300 according to the first embodiment of the present disclosure, and FIG. 4 is a view illustrating the display driving device 10*a* according to the first embodiment of the present disclosure in more detail.

Referring to FIGS. 3 and 4, the display driving device 10*a* includes the light emitting unit 100, the driving unit 200, and the switching unit 300, similarly to the conventional display driving device 9. However, although the driving unit 200 includes the driving thin-film transistor 220 and the storage capacitor 230 provided in the conventional display driving device 9, the display driving device 10*a* has a difference from the conventional display driving device 9 in that the driving unit 200 includes the memristor 210.

The memristor 210 has both of characteristics of sustaining the quantity of previous current for one frame similarly to the characteristic of the storage capacitor 230 included in the conventional display driving device 9 and of adjusting the quantity of a current similarly to the function of the driving thin-film transistor 220 included in the conventional display driving device 9.

In other words, the driving thin-film transistor 220 and the storage capacitor 230 in the conventional display driving device 9 may be substituted with the memristor 210 having both of characteristics of sustaining the quantity of previous current for one frame and of adjusting the quantity of current.

Figure 5:
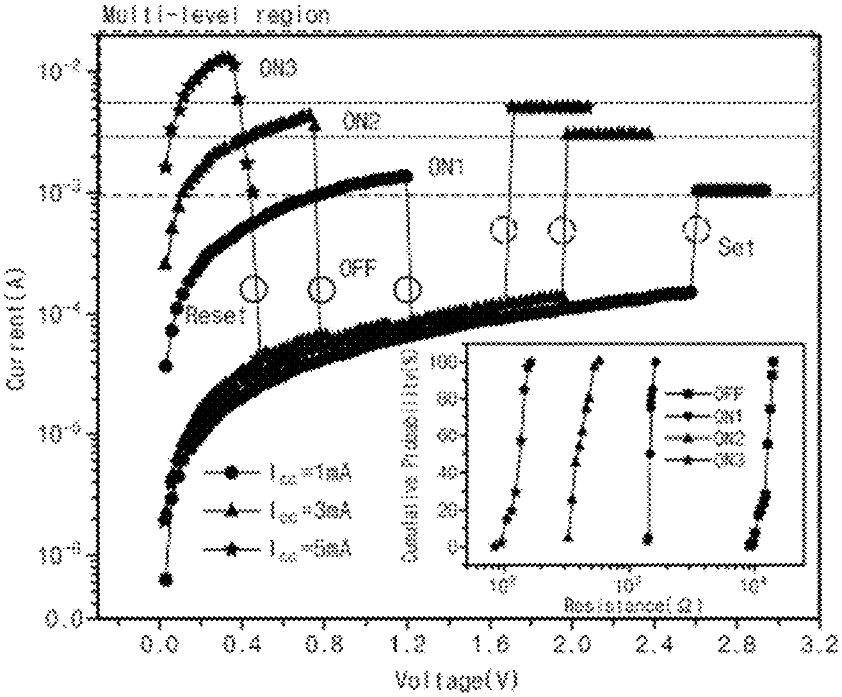
FIG. 5 is a graph illustrating the relation between a voltage and a current of the memristor.

FIG. 5 is a graph illustrating the relation between a voltage and a current of the memristor 210.

Referring to FIG. 5, it may be recognized that the memristor 210 has a characteristic of adjusting the quantity of current.

The memristor 210 has a set voltage and a reset voltage. The set voltage refers to a voltage for shifting the state of the memristor 210 from a higher-resistance state to a lower-resistance state, and the reset voltage refers to a voltage for shifting the state of the memristor 210 from the lower-resistance state to the higher-resistance state.

For example, in the case of the memristor 210 of FIG. 5, when the voltage is less than 2.6 V, a current of $10^{-4}$ Å flows, and then when the voltage exceeds 2.6 V, a current of $10^{-3}$ Å flows, which refers to that the resistance state of the memristor 210 is changed from the higher-resistance state to the lower-resistance state. Accordingly, it may be recognized that the memristor 210 in FIG. 5 has the set voltage of 2.6 V.

In contrast, as described above, a voltage is not applied for a specific time after the resistance state of the memristor 210 is changed to the lower-resistance state as the set voltage is input to the memristor 210. Thereafter, when a voltage of 1.2 V or less is applied to the memristor 210, a current of about $10^{-3}$ Å flows. Thereafter, it may be recognized that a current of about $10^{-4}$ Å flows when the voltage exceeds 1.2 V, which refers to that the resistance state of the memristor 210 is changed from the lower-resistance state to the higher-resistance state. Accordingly, it may be recognized that the memristor 210 in FIG. 5 has the reset voltage of 1.2 V.

As described above, the memristor 210 has the set voltage for shifting the resistance state of the memristor 210 from the higher-resistance state to the lower-resistance state and the reset voltage for shifting the resistance state of the memristor 210 from the lower-resistance state to the higher-resistance state. In addition, the memristor 210 has, without change, a characteristic of sustaining a resistance stored previously until the value of the voltage applied to the memristor 210 reaches the set voltage or the reset voltage.

Hereinafter, the structure of the display driving device 10*a* according to the first embodiment of the present disclosure, which includes the memristor 210 having the above characteristic, will be described in more detail.

The light emitting unit 100 is configured to include the light-emitting element 110.

The driving unit 200 is configured to include the memristor 210 to drive the light emitting unit 100.

The switching unit 300 is configured to include the switching thin-film transistor 310 and to determine whether apply the data voltage 31 to the driving unit 200 depending on the scan voltage 21.

One terminal of the driving unit 200 may be connected to a first node 11, and an opposite terminal of the driving unit 200 may be connected to the ground (GND). The first node 11, which refers to a node connected to the light emitting unit 100, the driving unit 200, and the switching unit 300, and the driving unit 200, may be configured to branch to the light emitting unit 100, the switching unit 300, and the driving unit 200, as illustrated in drawings.

For example, the driving unit 200 may include the memristor 210. Accordingly, one terminal of the memristor 210 may be connected to the first node 11, and an opposite terminal of the memristor 210 may be connected to the ground (GND).

The switching unit 300 may be configured to be connected to the first node 11, the gate line 20 for receiving the scan voltage 21, and the data line 30 for receiving the data voltage 31.

For example, the switching unit 300 may include the switching thin-film transistor 310. Accordingly, the gate terminal of the switching thin-film transistor 310 may be connected to the gate line 20, and the drain terminal of the switching thin-film transistor 310 may be connected to the first node 11, and the source terminal of the switching thin-film transistor 310 may be connected to the data line 30.

As the switching thin-film transistor 310 is included in the switching unit 300, the switching unit 300 may be configured to apply the data voltage 31 received from the data line 30 to the first node 11, when receiving the scan voltage 21 from the gate line 20.

The light emitting unit 100 may be configured to be connected to the first node 11 and the higher-potential voltage supply line 40 for receiving the higher-potential voltage 41.

For example, the light emitting unit 100 may include the light-emitting element 110. Accordingly, the light-emitting element 110 may be connected to the first node 11 and the higher-potential voltage supply line 40.

Figure 6:
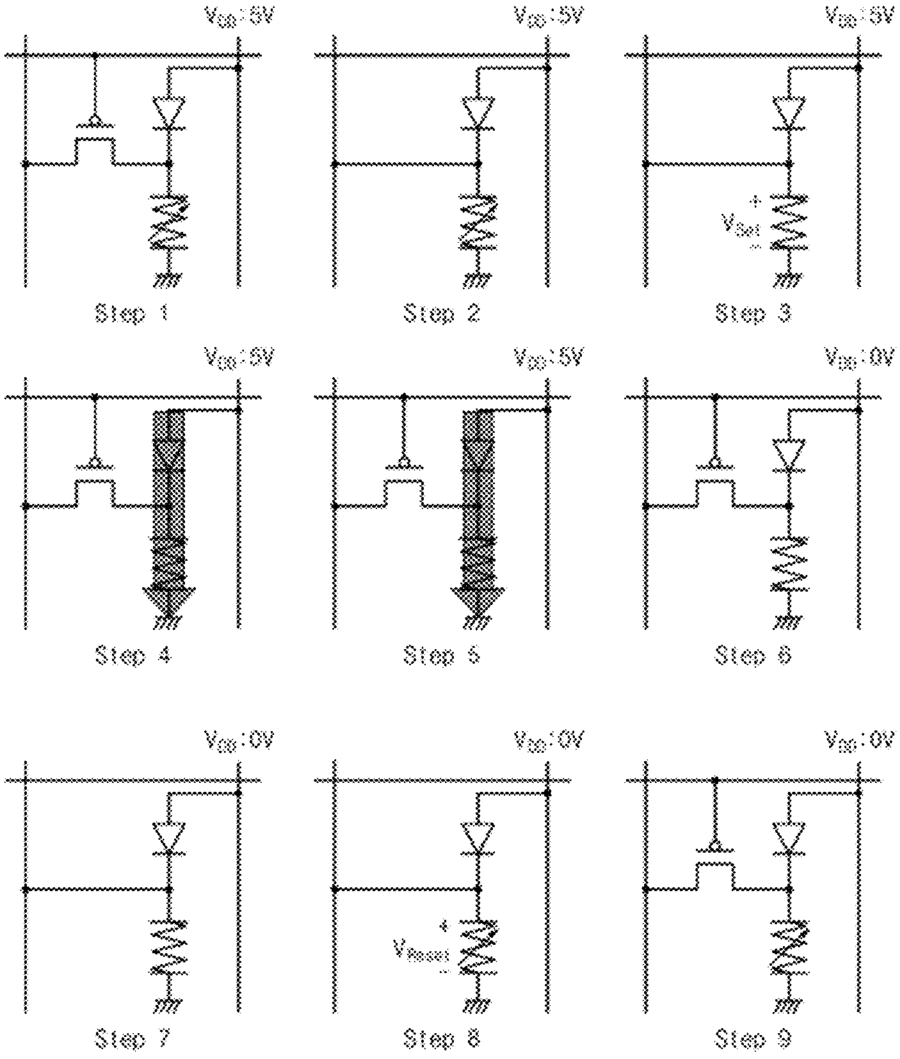
FIG. 6 is a view illustrating the operating procedure of the display driving device 10*a* according to the first embodiment of the present disclosure step by step.

FIG. 6 is a view illustrating the operating procedure of the display driving device 10*a* according to the first embodiment of the present disclosure step by step.

Referring to FIGS. 4 and 6, the display driving device 10*a* according to the first embodiment of the present disclosure operates through step #1 to step #9.

First, the higher-potential voltage 41 is applied through the higher-potential voltage supply line 40 (step #1). In this case, the memristor 210 may be in the higher-resistance state.

Next, the scan voltage 21 for turning on the switching thin-film transistor 310 is applied to the gate terminal of the switching thin-film transistor 310 through the gate line 20 (step #2).

Next, the set voltage for shifting the resistance state of the memristor 210 to the lower-resistance state is applied to the data line 30 (step #3).

The data voltage 31 to be applied to the data line 30 may be any one of the set voltage for shifting the resistance state of the memristor 210 from the higher-resistance state to the lower-resistance state, and the reset voltage for shifting the resistance state of the memristor 210 from the lower-resistance state to the higher-resistance state.

In step #3, as described above, the set voltage of the set voltage and the reset voltage is applied as the data voltage 31. Since the switching thin-film transistor 310 is turned on, the set voltage may be applied to the first node 11.

In this case, the voltage value of the set voltage applied to the memristor 210 may be set to have a different value for each memristor 210.

However, the value of the set voltage in step #3 of the present disclosure may be set to a value exceeding the difference between the value of the higher-potential voltage 41 and the value of the driving voltage of the light emitting element 110 and less than the value of the higher-potential voltage 41. This is to prevent the light emitting element 110 from being driven, when the set voltage is applied to the first node 11.

For example, when the higher-potential voltage 41 is 5 V and the driving voltage of the light emitting element 110 is 2.8 V, the set voltage may be provided as being in the range of 2.2 V to 5 V.

Next, the scan voltage 21 applied to the gate terminal of the switching thin-film transistor 310 is cut off to turn off the switching thin-film transistor 310 (step #4). In this case, a current generated due to the higher-potential voltage 41 flows through the light-emitting element 110 and the memristor 210.

Next, the current flows along the light-emitting element 110 and the memristor 210 for one frame by using the memristor 210 having the characteristics of sustaining the quantity of the previous current (step #5). In this case, the quantity of charges stored in the memristor 210 may be the quantity of charges allowing the current to flow along the light-emitting element 110 and the memristor 210 for one frame.

When the switching thin-film transistor 310 is turned off, the current generated due to the higher-potential voltage 41 flows to the ground (GND) along the light-emitting element 110 and the memristor 210. Accordingly, the light-emitting element 110 emits light.

In step #3, the set voltage is used to change the memristor 210 to be in the lower-resistance state. The brightness of light emitted from the light-emitting element 110 may be varied depending on the resistance value of the memristor 210 in the lower-resistance state.

In other words, the quantity of a current flowing through the light-emitting element 110 may be varied depending on the resistance value of the memristor 210 in the lower-resistance state, thereby adjusting the brightness of the light from the light-emitting element 110. To this end, multiple lower-resistance states of the memristor 210 are required. To this end, the memristor 210 may include a multi-level resistive random-access memory (ReRAm) element.

Figure 7A:
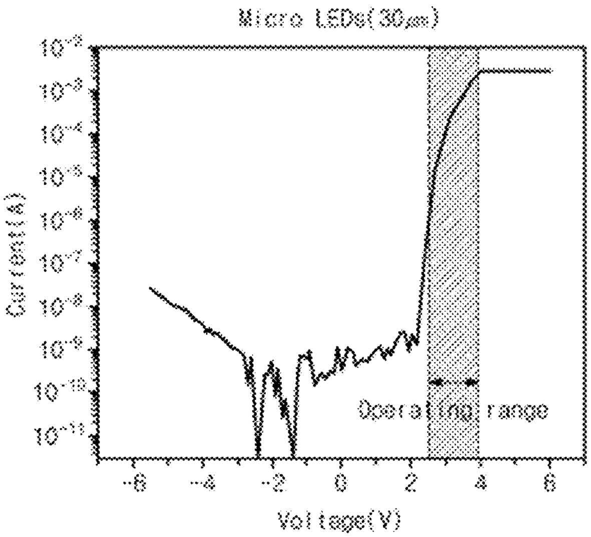
FIG. 7A is a graph illustrating an electrical characteristic of the light-emitting element 110 provided in the form of a light emitting diode having the size of 30 μm.
Figure 7B:
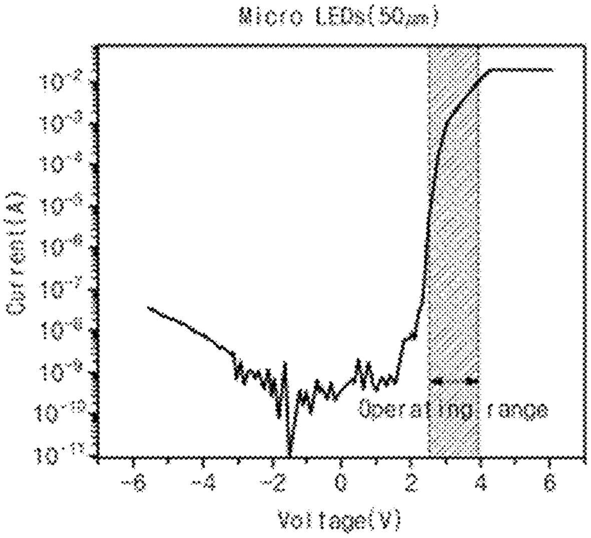
FIG. 7B is a graph illustrating an electrical characteristic of the light-emitting element 110 provided in the form of a light emitting diode having the size of 50 μm.
Figure 7C:
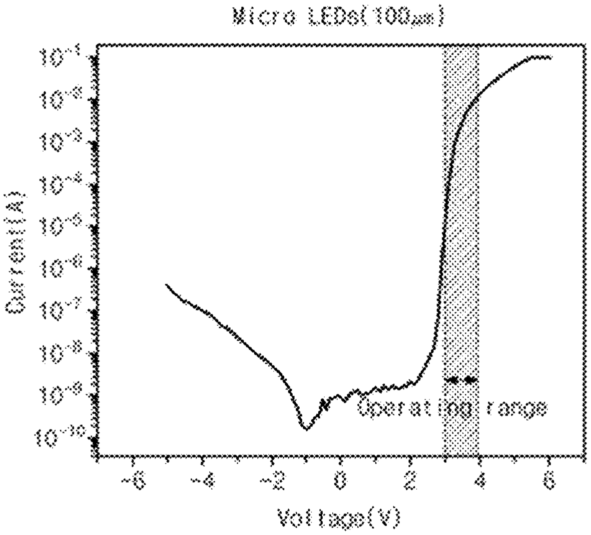
FIG. 7C is a graph illustrating an electrical characteristic of the light-emitting element 110 provided in the form of a light emitting diode having the size of 100 μm.

FIG. 7A is a graph illustrating an electrical characteristic of the light-emitting element 110 provided in the form of a light emitting diode having the size of 30 μm. FIG. 7B is a graph illustrating an electrical characteristic of the light-emitting element 110 provided in the form of a light emitting diode having the size of 50 μm. FIG. 7C is a graph illustrating an electrical characteristic of the light-emitting element 110 provided in the form of a light emitting diode having the size of 100 μm.

Referring to FIGS. 7A to 7C, the light-emitting element 110 includes a micro-LED having the size of 30 μm, 50 μm or 100 μm. Regarding the variation of a current value as a function of a voltage value in each light-emitting element 110, it may be recognized that three cases show that the current has a great variation depending on the voltage value ranging from 2.2 V to 4 V, which refers to that the brightness of the light-emitting element 110 is easily adjusted in the range of 2.2 V to 4 V.

Figure 8:
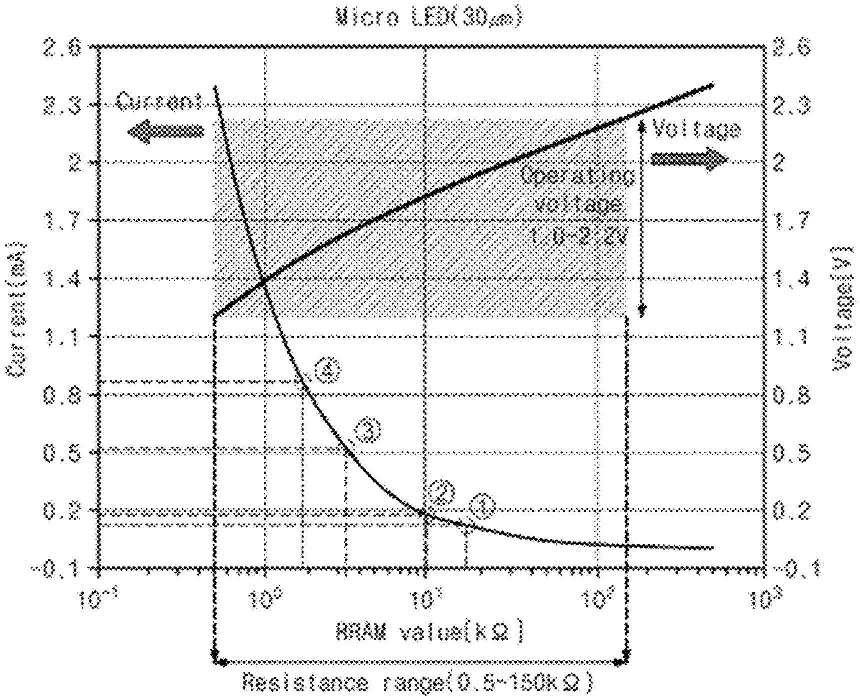
FIG. 8 is a graph illustrating a required resistance range of the memristor 210 when the micro-LED having the size of 30 μm is used as the light-emitting element 110.
Figure 9:
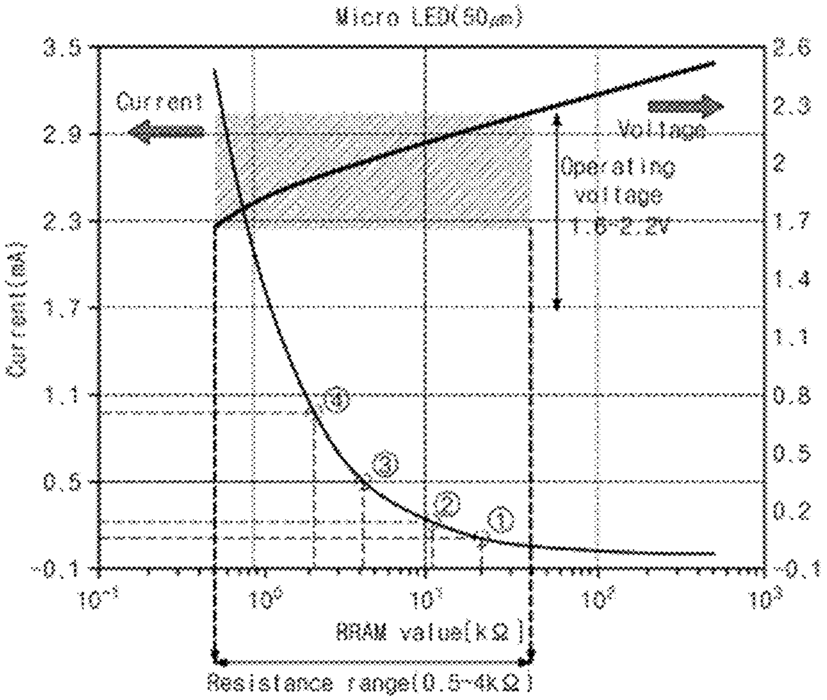
FIG. 9 is a graph illustrating a required resistance range of the memristor 210 when the micro-LED having the size of 50 μm is used as the light-emitting element 110.
Figure 10:
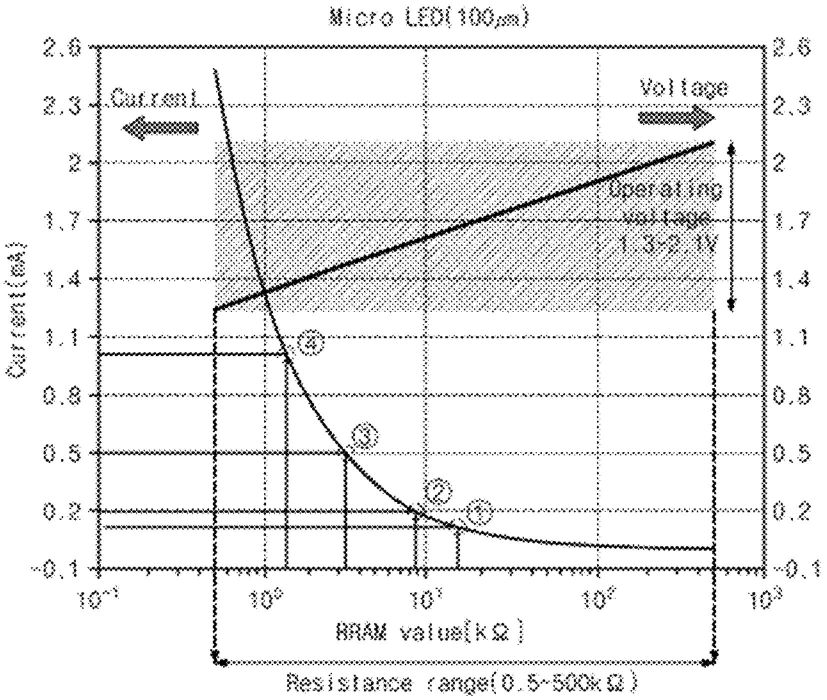
FIG. 10 is a graph illustrating a required resistance range of the memristor 210 when the micro-LED having the size of 100 μm is used as the light-emitting element 110

FIG. 8 is a graph illustrating a required resistance range of the memristor 210 when the micro-LED having the size of 30 μm is used as the light-emitting element 110. FIG. 9 is a graph illustrating a required resistance range of the memristor 210 when the micro-LED having the size of 50 μm is used as the light-emitting element 110. FIG. 10 is a graph illustrating a required resistance range of the memristor 210 when the micro-LED having the size of 100 μm is used as the light-emitting element 110

Referring to FIGS. 7 to 10, when the higher-potential voltage 41 of 5 V is provided, the brightness of the light-emitting element 110 may be easily adjusted in the range of 2.2 V to 4 V. Accordingly, the voltage distributed for the memristor 210 is preferably provided in the range of 1 V to 2.2 V.

Therefore, as illustrated in FIGS. 8 to 10, the resistance of the memristor 210 is 0.5 kΩ to 150 kΩ, when an LED having the size of 30 μm is used as the light-emitting element 110, the resistance of the memristor 210 is 0.5 kΩ to 4 kΩ, when an LED having the size of 50 μm is used as the light-emitting element 110, and the resistance of the memristor 210 is 0.5 kΩ to 500 kΩ, when an LED having the size of 100 μm is used as the light-emitting element 110.

Referring to FIG. 6 again, the higher-potential voltage 41 applied to the higher-potential voltage supply line 40 is cut off (step #6).

Next, the scan voltage 21 for turning on the switching thin-film transistor 310 is applied to the gate terminal of the switching thin-film transistor 310 through the gate line 20 (step #7).

Next, the reset voltage, which is a voltage for shifting the resistance state of the memristor 210 to the higher-resistance state, is applied to the data line 30 (step #8).

The voltage value of the reset voltage applied to the memristor 210 may be set to have a mutually different value for each memristor 210.

However, the value of the reset voltage should exceed the difference between the higher-potential voltage 41 and the driving voltage of the light-emitting element 110 in step #8 according to the present disclosure. This is to prevent the memristor 210 from being unintentionally reset due to the voltage distributed for the memristor 210.

For example, when the higher-potential voltage 41 is 5 V, and the driving voltage of the light-emitting element 110 is in the range of 2.8 V to 4 V, the voltage ranging from 1 V to 2.2 V is distributed for the memristor 210. When the reset voltage is less than 2.2 V, the memristor 210 may be unintentionally reset due to the voltage applied across the memristor 210. Accordingly, the reset voltage of memristor 210 should exceed the difference between the higher-potential voltage 41 and the driving voltage of the light-emitting element 110.

In addition, as illustrated in FIG. 5, the reset voltage should be set to be less than the set voltage in step #3.

As described above, when the data voltage 31 applied to the data line 30 in step #8 is the reset voltage, the state of the memristor 210 is shifted to the higher resistance state.

Finally, the scan voltage 21 applied to the gate terminal of the switching thin-film transistor 310 is cut off to turn off the switching thin-film transistor 310 (step #9).

Although the driving thin-film transistor 220 and the storage capacitor 230 are substituted with the memristor 210 through step #1 to step #9, the light-emitting element 110 may operate for one frame.

When compared between the operating procedure of the conventional display driving device 9 in FIG. 2, and the operating procedure of the display driving device 10*a* in FIG. 6, step #7 and step #9 are added to steps of FIG. 2.

However, it is obvious that there is no problem resulting from step #7 to step #9 because the memristor 210 operates in tens of nano-seconds (sec), when considering the general operating speed of tens of milli-seconds (sec).

Figure 11:
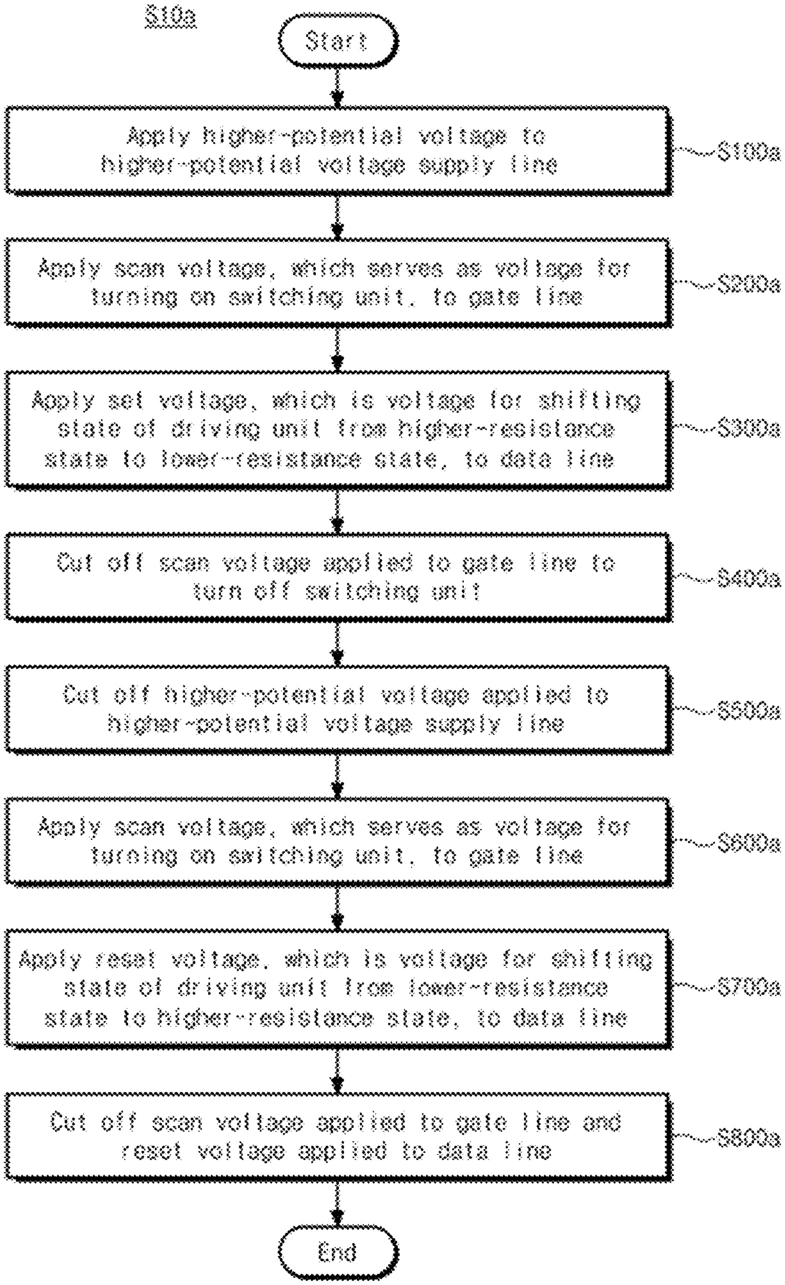
FIG. 11 is a flowchart illustrating a display driving method (S10*a*) according to the first embodiment of the present disclosure.

FIG. 11 is a flowchart illustrating a display driving method (S10*a*) according to the first embodiment of the present disclosure.

Referring to FIG. 1, the display driving method (S10*a*) according to the first embodiment of the present disclosure includes S100*a* to S800*a*.

S100*a* refers to a step of applying the higher-potential voltage 41 to the higher-potential voltage supply line 40, which corresponds to step #1 of the present disclosure.

S200*a* refers to a step of applying the scan voltage 21, which serves as a voltage for turning on the switching unit 300, to the gate line 20, which corresponds to step #2 of the present disclosure.

S300*a* refers to a step of applying the set voltage, which is a voltage for shifting the state of the driving unit 200 from the higher-resistance state to the lower-resistance state, to the data line 30, which correspond to step #3 of the present disclosure.

S400*a* refers to a step of cutting off the scan voltage applied to the gate line to turn off the switching unit 300, which corresponds to step #4 of the present disclosure.

S500*a* refers to a step of cutting off the higher-potential voltage 41 applied to the higher-potential voltage supply line 40, which corresponds to step #6 of the present disclosure.

S600*a* refers to a step of applying the scan voltage 21, which serves as a voltage for turning on the switching unit 300, to the gate line 20, which corresponds to step #7 of the present disclosure.

S700*a* refers to a step of applying the reset voltage, which is a voltage for shifting the state of the driving unit 200 from the lower-resistance state to the higher-resistance state, to the data line 30, which correspond to step #8 of the present disclosure.

S800*a* refers to a step of cutting off the scan voltage from the gate line 20 and reset voltage from the data line 30, which corresponds to step #9 of the present disclosure.

Figure 12:
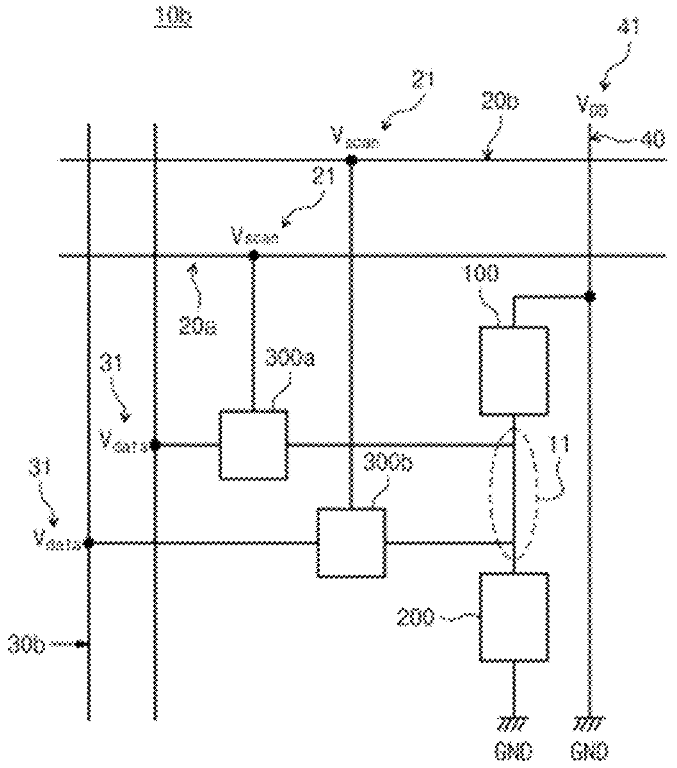
FIG. 12 is a view illustrating the display driving device 10*a* including the light emitting unit 100, the driving unit 200, the first switching unit 300*a*, and the second switching unit 300*b* according to a second embodiment of the present disclosure.
Figure 13:
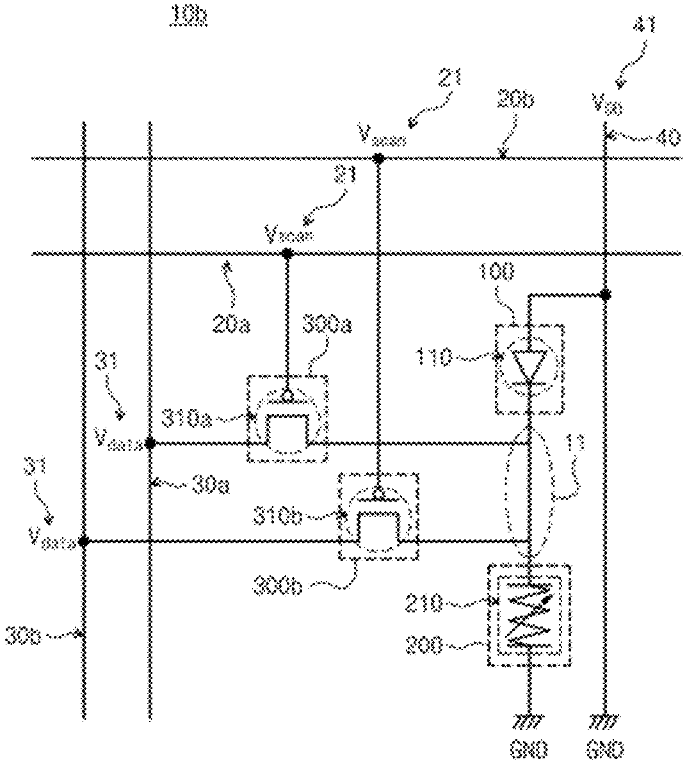
FIG. 13 is a view illustrating the display driving device 10*b* according to the second embodiment of the present disclosure in more detail.

FIG. 12 is a view illustrating the display driving device 10*b* including the light emitting unit 100, the driving unit 200, the first switching unit 300*a*, and the second switching unit 300*b* according to the second embodiment of the present disclosure, and FIG. 13 is a view illustrating the display driving device 10*b* according to the second embodiment of the present disclosure in more detail.

Referring to FIGS. 12 and 13, the display driving device 10*b* according to the second embodiment of the present disclosure may include a plurality of gate lines, a plurality of data lines, and a plurality of switching lines, for example, a first gate line 20*a*, a second gate line 20*b*, a first data line 30*a*, a second data line 30*b*, a first switching unit 300*a*, and a second switching unit 300*b*.

According to the first embodiment of the present disclosure, the display driving device 10*a* applies both the set voltage and the reset voltage through one data line.

However, according to the second embodiment of the present disclosure, the display driving device 10*b* may individually apply the set voltage and the reset voltage through a data line (the first data line; 30*a*) for applying the set voltage and a data line (the second data line; 30*b*) for applying the reset voltage.

In more detail, the gate terminal of the first switching thin-film transistor 310*a* included in the first switching unit 300*a* may be connected to the first gate line 20*a*, and the drain terminal of the first switching thin-film transistor 310*a* may be connected to the first node 11, and the source terminal of the first switching thin-film transistor 310 may be connected to the first data line 30*a*.

In addition, the gate terminal of the second switching thin-film transistor 310*b* included in the second switching unit 300*b* may be connected to the second gate line 20*b*, and the drain terminal of the second switching thin-film transistor 310*b* may be connected to the first node 11, and the source terminal of the second switching thin-film transistor 310*b* may be connected to the second data line 30*b*.

Figure 14:
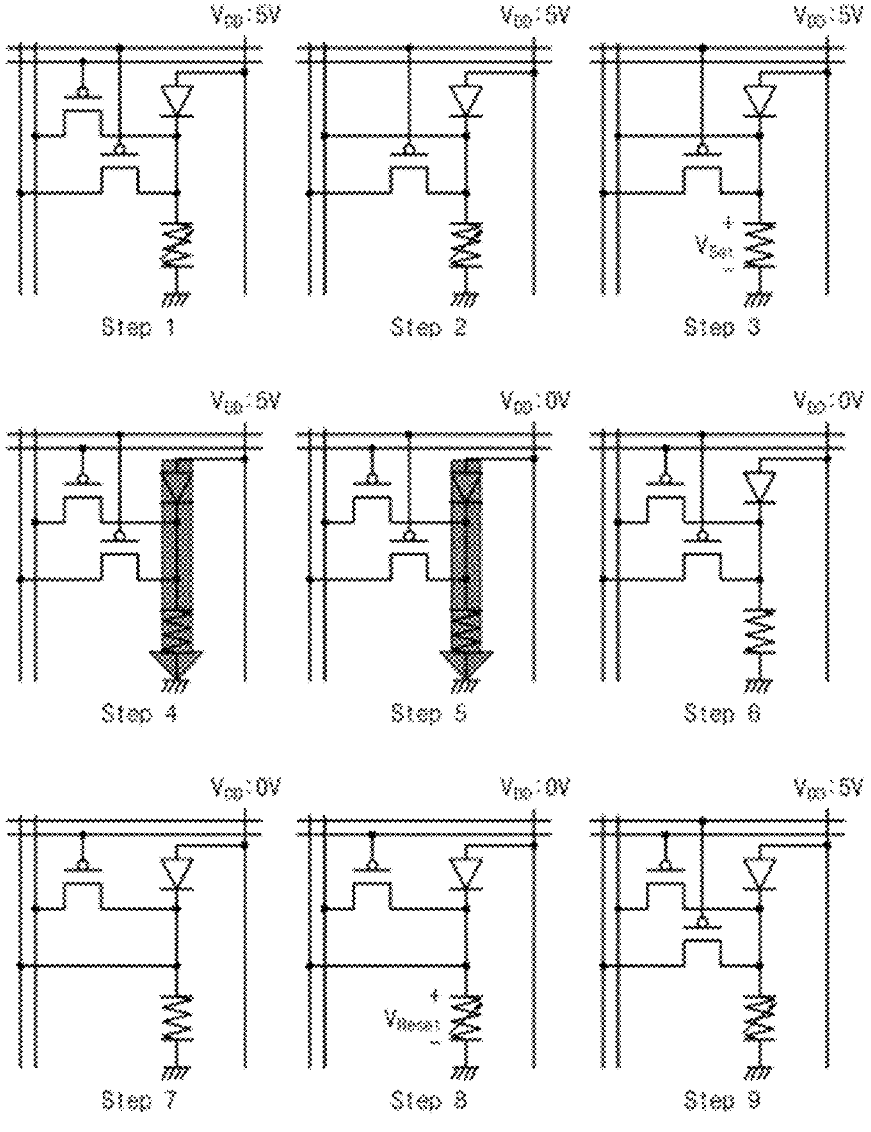
FIG. 14 is a view illustrating the operating procedure of the display driving device 10*b* according to the second embodiment of the present disclosure step by step.

FIG. 14 is a view illustrating the operating procedure of the display driving device 10*b* according to the second embodiment of the present disclosure step by step.

Referring to FIGS. 13 and 14, the display driving device 10*b* according to the second embodiment of the present disclosure operates through step #1 to step #9.

First, the higher-potential voltage 41 is applied through the higher-potential voltage supply line 40 (step #1). In this case, the memristor 210 may be in the higher-resistance state.

Next, the scan voltage 21 for turning on the first switching thin-film transistor 310*a* is applied to the gate terminal of the first switching thin-film transistor 310*a* through the first gate line 20*a* (step #2).

Next, the set voltage, which is a voltage for shifting the state of the memristor 210 to the lower-resistance state, is applied to the first data line 30*a* (step #3).

Next, the scan voltage 21 applied to the gate terminal of the first switching thin-film transistor 310*a* is cut off to turn off the first switching thin-film transistor 310*a* (step #4). In this case, the current generated due to the higher-potential voltage 41 flows along the light-emitting element 110 and the memristor 210.

Next, the current flows along the light-emitting element 110 and the memristor 210 for one frame by using the memristor 210 having the characteristics of sustaining the quantity of a previous current for one frame (step #5). In this case, the quantity of charges stored in the memristor 210 may be the quantity of charges allowing the current to flow along the light-emitting element 110 and the memristor 210 for one frame.

Thereafter, the higher-potential voltage 41 applied through the higher-potential voltage supply line 40 is cut off (step #6).

Next, the scan voltage 21 for turning on the second switching thin-film transistor 310*b* is applied to the gate terminal of the second switching thin-film transistor 310*b* through the second gate line 20*b* (step #7).

Next, the reset voltage, which is a voltage for shifting the state of the memristor 210 to the higher-resistance state, is applied to the second data line 30*b* (step #8).

Finally, the scan voltage 21 applied to the gate terminal of the second switching thin-film transistor 310*b* is cut off to turn off the second switching thin-film transistor 310*b* (step #9).

Figure 15:
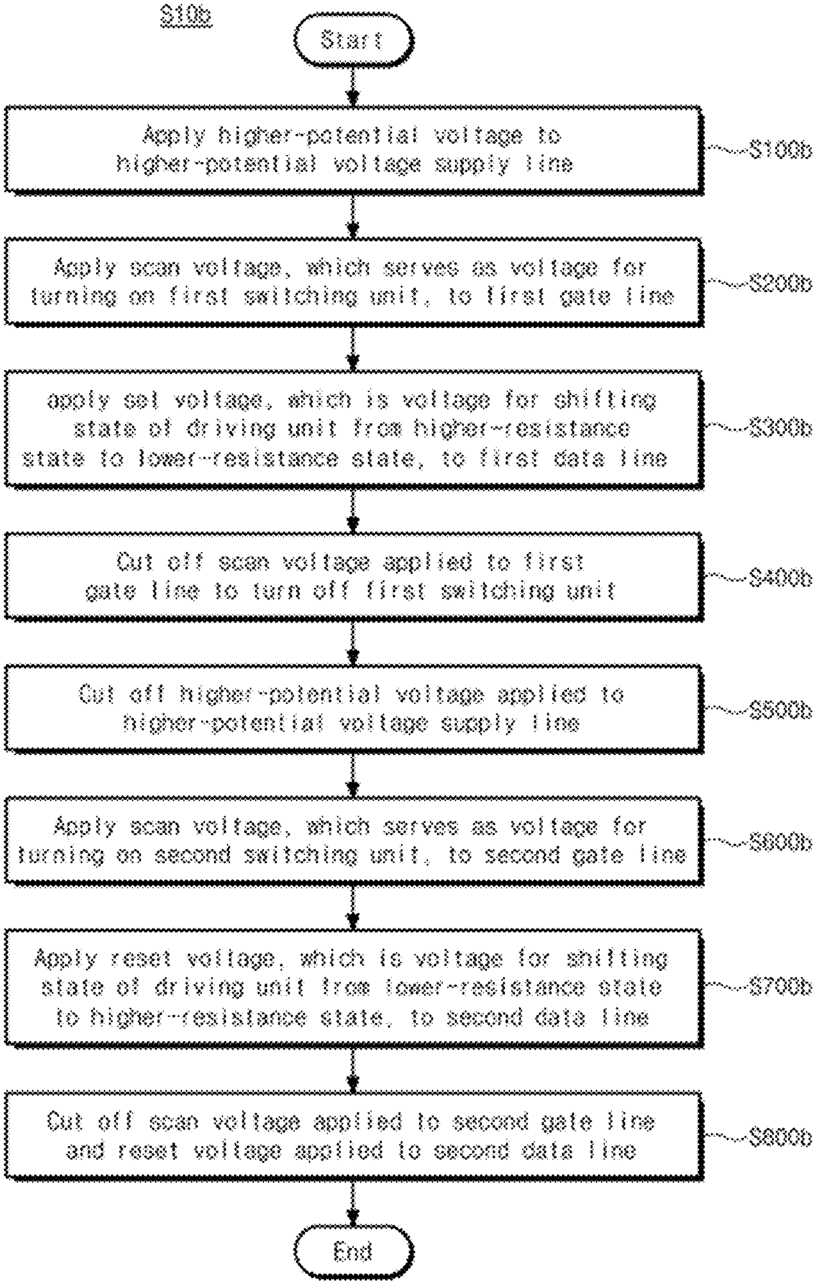
FIG. 15 is a flowchart illustrating a display driving method (S10*b*) according to the second embodiment of the present disclosure.

FIG. 15 is a flowchart illustrating the display driving method (S10*b*) according to a second embodiment of the present disclosure.

Referring to FIG. 15, the display driving method (S10*b*) according to the second embodiment of the present disclosure includes S100*b* to S800*b*.

S100*b* refers to a step of applying the higher-potential voltage 41 to the higher-potential voltage supply line 40, which corresponds to step #1 of the present disclosure.

S200*b* refers to a step of applying the scan voltage 21, which serves as a voltage for turning on the first switching unit 300*a*, to the first gate line 20*a*, which corresponds to step #2 of the present disclosure.

S300*b* refers to a step of applying the set voltage, which is a voltage for shifting the state of the driving unit 200 from the higher-resistance state to the lower-resistance state, to the first data line 30*a*, which correspond to step #3 of the present disclosure.

S400*b* refers to a step of cutting off the scan voltage applied to the first gate line 20*a* to turn off the first switching unit 300*a*, which corresponds to step #4 of the present disclosure.

S500*b* refers to a step of cutting off the higher-potential voltage 41 applied to the higher-potential voltage supply line 40, which correspond to step #5 and step #6 of the present disclosure.

S600*b* refers to a step of applying the scan voltage 21, which serves as a voltage for turning on the second switching unit 300*b*, to the second gate line 20*b*, which corresponds to step #7 of the present disclosure.

S700*b* refers to a step of applying the set voltage, which is a voltage for shifting the state of the driving unit 200 from the lower-resistance state to the higher-resistance state, to the second data line 30*b*, which correspond to step #8 of the present disclosure.

S800*b* refers to a step of cutting off the scan voltage from the second gate line 20*b* and the reset voltage from the second data line 30*b*, which corresponds to step #9 of the present disclosure.

As described above, according to the present disclosure, the display driving device 10*a* or 10*b* according to the first embodiment or the second embodiment of the present disclosure and the display driving method S10*a* or S10*b* according to the first embodiment or the second embodiment may provide the display driving circuit in the AM type minimized in volume and simplified in structure.

As described above, an embodiment of the present disclosure has been described regarding display device and method for controlling light-emitting element by using memristor for the illustrative purpose, but the present disclosure is not limited thereto. The present disclosure should be understood as having the widest scope based on the fundamental technical spirit of the present disclosure. Those skilled in the art can reproduce the present disclosure in a pattern not described therein through the combination and the substitution of embodiments disclosed herein, without departing from the scope of the present disclosure. In addition, it is obvious that those skilled in the art may easily change or modify the disclosed embodiment, based on the present specification, and the change or the modification belongs to the scope of the present disclosure.

The invention claimed is:

1. A display driving device, comprising:

a light emitting unit configured to include a light emitting element;

a driving unit including a memristor and configured to drive the light emitting unit; and a switching unit including a switching thin-film transistor and configured to determine, depending on a scan voltage, whether to apply a data voltage to the driving unit, wherein the switching unit is configured to be directly connected to a first node, a gate line for receiving the scan voltage, and a data line for receiving the data voltage, and wherein the first node is directly connected to each of the light emitting unit, the driving unit, and the switching unit.

2. The display driving device of claim 1, wherein the driving unit is configured to:

be connected to the first node branching to the light emitting unit and the switching unit.

3. The display driving device of claim 1, wherein the switching unit is configured to apply the data voltage, which is input from the data line, to the first node when the scan voltage is input from the gate line.

4. The display driving device of claim 1, wherein the light emitting unit is configured to:

be connected to the first node and a high-potential voltage supply line for receiving a higher-potential voltage.

5. A display driving method performed by the display driving device according to claim 1, the display driving method comprising:

(a) applying a higher-potential voltage to a higher-potential voltage supply line;

(b) applying a scan voltage, which is a voltage for turning on a switching unit, to a gate line;

(c) applying a set voltage, which is a voltage for shifting a state of a driving unit from a higher-resistance state to a lower-resistance state, to a data line;

(d) cutting off the scan voltage applied to the gate line to turn off the switching unit;

(e) cutting off the higher-potential voltage applied to the higher-potential voltage supply line;

(f) applying the scan voltage, which is the voltage for turning on the switching unit, to the gate line;

(g) applying a reset voltage, which is a voltage for shifting the state of the driving unit from the lower-resistance state to the higher-resistance state, to the data line; and (h) cutting off the scan voltage applied to the gate line and the reset voltage applied to the data line.

6. A display driving device, comprising:

a light emitting unit configured to include a light emitting element;

a driving unit including a memristor and configured to drive the light emitting unit; and a switching unit including a switching thin-film transistor and configured to determine, depending on a scan voltage, whether to apply a data voltage to the driving unit, wherein the driving unit is configured to be connected to a first node branching to the light emitting unit and the switching unit, wherein the switching unit is configured to be connected to the first node, a gate line for receiving the scan voltage, and a data line for receiving the data voltage, wherein the light emitting unit is configured to be connected to the first node and a high-potential voltage supply line for receiving a higher-potential voltage, and wherein the data voltage is a set voltage for shifting a state of the memristor from a higher-resistance state to a lower-resistance state, or a reset voltage for shifting the state of the memristor from the lower-resistance state to the higher-resistance state.

7. The display driving device of claim 6, wherein the driving unit:

shifts the state of the memristor to be in the lower-resistance state without driving the light emitting unit, when the set voltage is applied to the first node;

drives the light emitting unit, when the data voltage is not applied to the first node; and shifts the state of the memristor to be in the higher-resistance state without driving the light emitting unit, when the reset voltage is applied to the first node.

8. The display driving device of claim 6, wherein the set voltage exceeds a difference between the higher-potential voltage and a driving voltage of the light emitting element, and is less than the higher-potential voltage.

9. The display driving device of claim 8, wherein the reset voltage exceeds the difference between the higher-potential voltage and the driving voltage of the light emitting element, and is less than the set voltage.

10. A display driving device, comprising:

a light emitting unit configured to include a light emitting element;

a driving unit including a memristor and configured to drive the light emitting unit; and a switching unit including a switching thin-film transistor and configured to determine, depending on a scan voltage, whether to apply a data voltage to the driving unit, wherein the driving unit is configured to be connected to a first node branching to the light emitting unit and the switching unit, wherein the switching unit is configured to be connected to the first node, a gate line for receiving the scan voltage, and a data line for receiving the data voltage, wherein the switching unit includes:

a first switching unit and a second switching unit, wherein the gate line includes:

a first gate line for receiving a scan voltage for an operation of the first switching unit and a scan voltage for an operation of the second switching unit, and wherein the data line includes:

a first data line for receiving a set voltage; and a second data line for receiving a reset voltage.

11. The display driving device of claim 10, wherein the first switching unit is configured to:

be connected to the first node, the first gate line, and the first data line.

12. The display driving device of claim 11, wherein the second switching unit is configured to:

be connected to the first node, the second gate line, and the second data line.

13. A display driving method performed by the display driving device according to claim 10, the display driving method comprising:

(a) applying a higher-potential voltage to a higher-potential voltage supply line;

(b) applying a scan voltage, which is a voltage for turning on a first switching unit, to a first gate line;

(c) applying a set voltage, which is a voltage for shifting a state of a driving unit from a higher-resistance state to a lower-resistance state, to a first data line;

(d) cutting off the scan voltage applied to the first gate line to turn off the first switching unit;

(e) cutting off the higher-potential voltage applied to the higher-potential voltage supply line;

(f) applying a scan voltage, which is a voltage for turning on a second switching unit, to a second gate line;

(g) applying a set voltage, which is a voltage for shifting the state of the driving unit from the lower-resistance state to the higher-resistance state, to a second data line; and (h) cutting off the scan voltage applied to the second gate line and the reset voltage applied to the second data line.

* * * * *